United States Patent

Rando

[11] Patent Number: 5,959,789
[45] Date of Patent: Sep. 28, 1999

[54] ONE PIECE BEAM ANGLE ADJUSTMENT ELEMENT

[75] Inventor: Joseph F. Rando, Los Altos Hills, Calif.

[73] Assignee: LeveLite Technology, Inc., Mt. View, Calif.

[21] Appl. No.: 08/882,693

[22] Filed: Jun. 25, 1997

[51] Int. Cl.$^6$ .................................................. G02B 7/02
[52] U.S. Cl. ............................................................ 359/822
[58] Field of Search ...................... 359/822, 405; 33/286, 290, 291, 292; 356/245, 247, 248, 249, 252, 254

[56] References Cited

U.S. PATENT DOCUMENTS 5,442,860  8/1995  Palmer ........................................ 33/233
5,499,455  3/1996  Palmer ........................................ 33/233
5,619,802  4/1997  Rando et al. ............................... 33/291

*Primary Examiner*—Georgia Epps
*Assistant Examiner*—Ricky Mack
*Attorney, Agent, or Firm*—Thomas M. Freiburger

[57] ABSTRACT

A beam angle adjustment element for a measurement instrument projecting a collimated beam, such as a laser construction layout instrument, utilizes a single optic at the beam exit of the instrument for final tilt adjustment. The optic, a low magnification telescope formed of a single, integral optical component, has an annular edge in contact with a frame of the instrument. Tilting of the weak telescope in the frame seat adjusts the angularity of the collimated light beam for very finely tuning the beam direction. For example, with a particular weak telescope the telescope can be tilted 5 degrees to obtain a 3.6 minute adjustment. The optical element may be fixed in place in the seat with glue, or a screw threaded mechanism can be provided for adjustment and retention of the optic in place.

19 Claims, 4 Drawing Sheets

$$M = \frac{R1}{R2} \qquad M = 1 + \frac{T}{R2}\left[\frac{n-1}{n}\right]$$

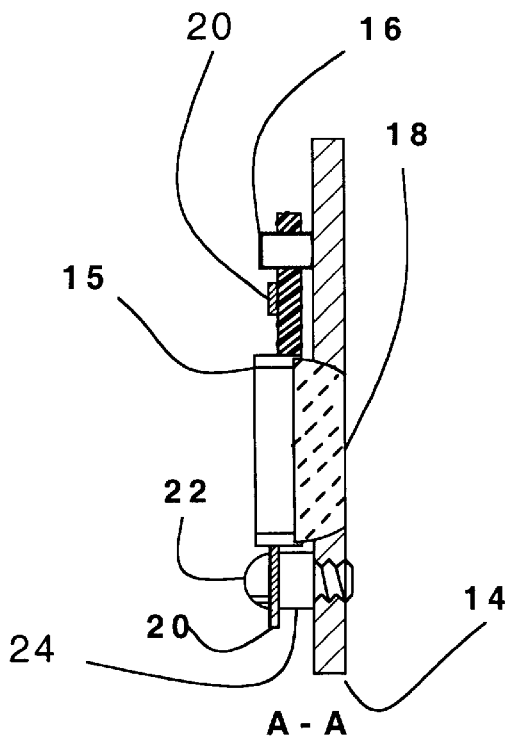
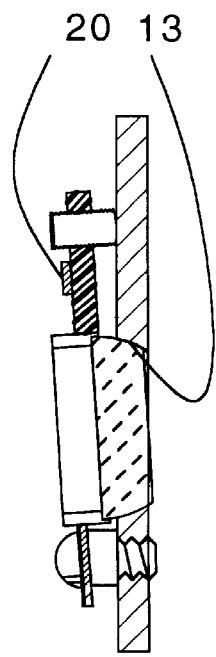
Fig. 8A  Fig. 8B
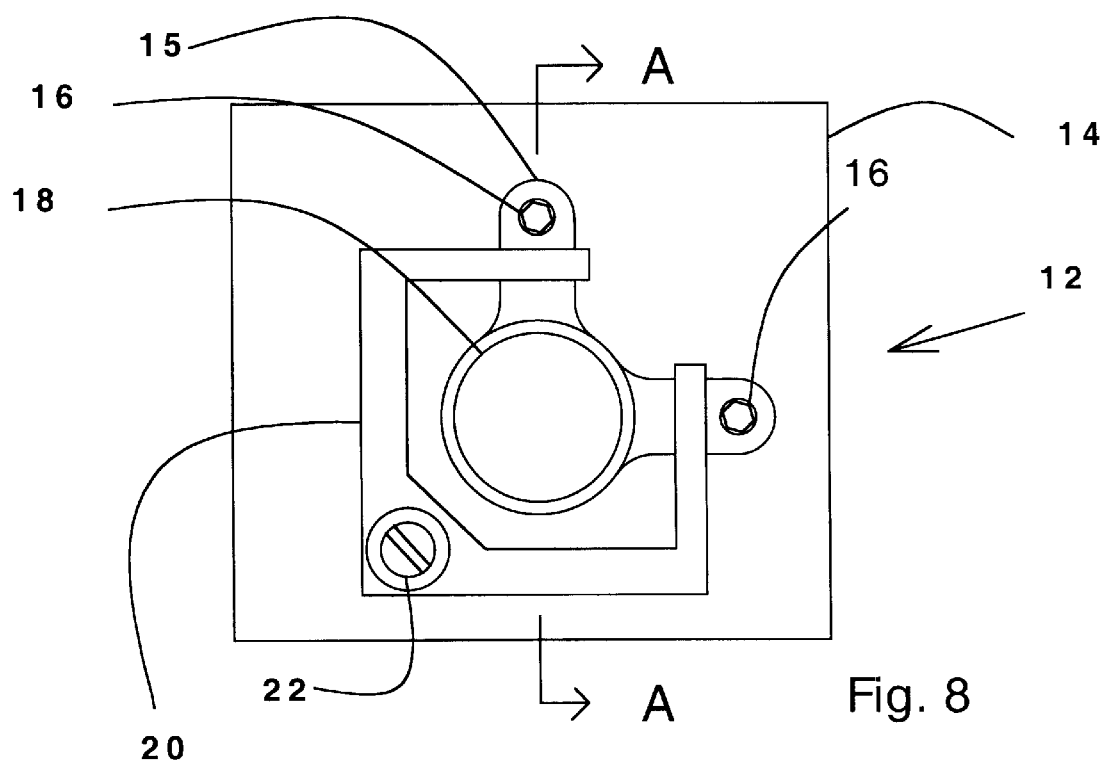
Fig. 8

ONE PIECE BEAM ANGLE ADJUSTMENT ELEMENT

BACKGROUND OF THE INVENTION

This invention relates to optical instruments in which collimated rays of light must be positioned precisely.

In the manufacture of laser construction alignment instruments, for example, it is necessary that the beam correspond to a mechanical or optical reference. This is accomplished by either steering the beam or altering a mechanical reference. The reference could be an external housing, the axis of a level vial, or another beam of light. This invention has to do with steering or angularly adjusting the beam to correspond to a reference.

Beam adjusting or steering is typically done using an optical element such as a mirror, prisms, or a lens. FIG. 1 shows some typical methods of adjusting the beam angle by tilting a mirror with an adjustment screw. Fine motion of the beam is difficult in this method because there is a two-to-one relationship between the mirror angle and the beam angle. In addition, pitch of the screw must be fine to allow small angles of tilt.

An alternate method of finely steering a beam of light is shown in FIG. 2. Translating the lens in the direction of the arrow steers the beam in the upward direction. This method is attractive because the sensitivity can be controlled by the focal length of the lens.

FIG. 3 shows the use of rotatable prisms to steer a beam. When the prism is rotated about the axis of the incoming beam, the outgoing beam moves on an arc. By using two such prisms at 90 degrees to each other, each rotatable about the incoming beam, the outgoing beam may be finely adjusted in any desired direction.

The three methods shown in the figures require several mechanical parts to provide the adjustment and lock it in place as is required in any rugged instrument. These methods are, therefore, costly. Such instruments must also be hermetic which further adds to the cost because of the need for a sealed window.

The subject invention provides a method for finely steering, i.e., angularly adjusting, a collimated beam of light using a single low cost plastic optic, while hermetically sealing the instrument at the same time. The invention comprises a one piece very low magnification telescope design.

In a conventional telescope focused at infinity and viewed by a perfect observer's eye, a collimated beam of light enters the telescope, is magnified, and exits the telescope as a collimated beam of light. As shown in FIG. 4, in a like manner, rays at an angle A to axis C of the telescope are magnified by M, where M is the telescope's magnification. The angular deviation of the beam, however, is A×(M−1) as shown. For a telescope of magnification 1.01, this is a 1% angular deviation of the beam.

To observe the effect of tilting the telescope, we may tilt the entire system shown in FIG. 4 without changing the optical paths. As can be seen from FIG. 5, tilting the telescope by an angle A causes a beam deviation of M−1 times A. In this way very fine control of the beam pointing can be obtained by tilting such a weak telescope.

Such a low magnification telescope can be easily fabricated as a single plastic or glass optic. FIG. 6 shows the construction details of the optic. In a typical design with a 1.012 magnification, the radii and thickness are 121.4 mm, 120 mm, and 2.92 mm, respectively, for an acrylic plastic optic. Such a telescope could be tilted +/−5 degrees to obtain +/−3.6 minutes of adjustment of the transmitted beam. For some alignment purposes, it is sometimes beneficial to have a net prism deviation or variable net optical wedge function in the optic to allow for fixed misalignment. This can be installed in the same optic with no loss of performance, and it combines the benefits of a thin optical wedge with the adjustment feature of the telescope itself, without requiring two separate optical elements. The optical wedge shifts the beam angle adjustment center, increasing adjustment in one direction; the optical element can be rotated to position the increased effect in the direction desired. The low magnification telescope, adjustable on assembly, is thus equivalent to a variable optical wedge.

When the optic is provided with an approximately spherical surface at the edges of the optic it can be easily tilted and provide a hermetic seal.

It is among the objects of the invention to provide a simple, inexpensive and reliable angular adjustment for a tool projecting a light beam for measurement, alignment or other purposes. This and other objects, advantages and features of the invention will be apparent from the following description of a preferred embodiment, considered along with the accompanying drawings.

DESCRIPTION OF THE DRAWINGS

FIGS. 8, 8A and 8B show a preferred embodiment of the optic with fine screw adjustment and spring capture system.

DESCRIPTION OF THE PREFERRED EMBODIMENTS

Figure 1:
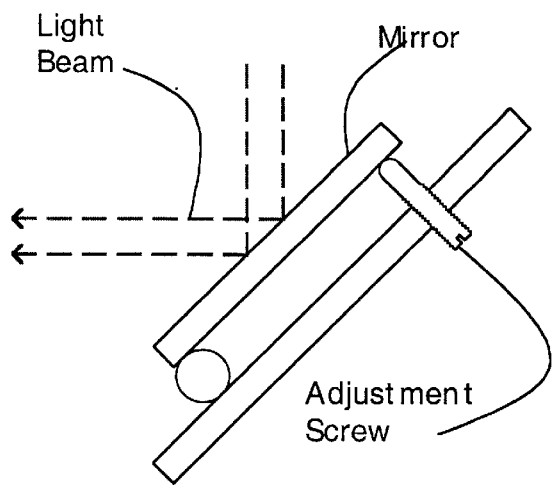
FIG. 1 is a side view of a conventional mirror angle adjusting apparatus in the prior art.
Figure 2:
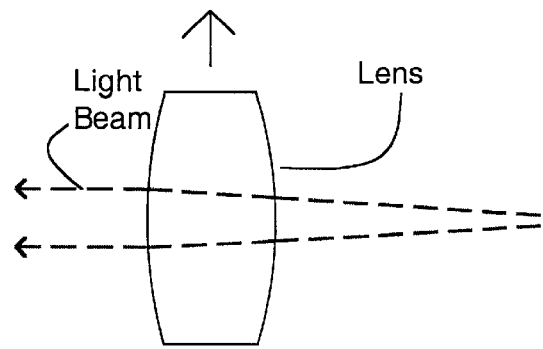
FIG. 2 is a side view of a lens used to steer a light beam by translating the lens, as in the prior art.
Figure 3:
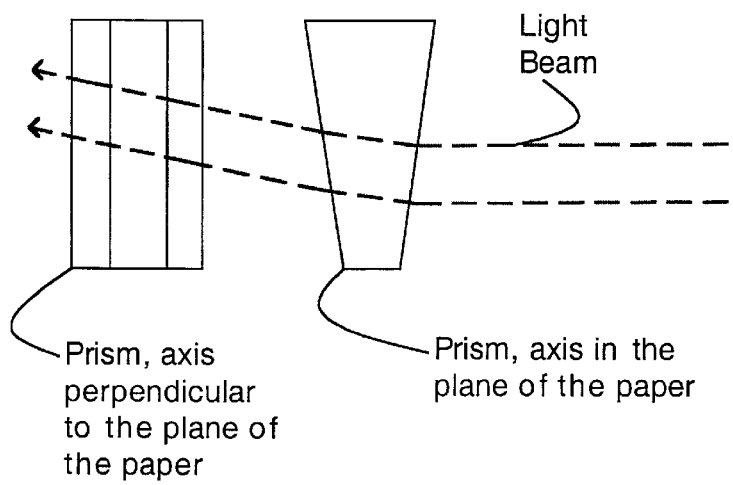
FIG. 3 is a side view of two rotatable prisms used to steer a light beam by rotating one or both prisms, as in the prior art.
Figure 4:
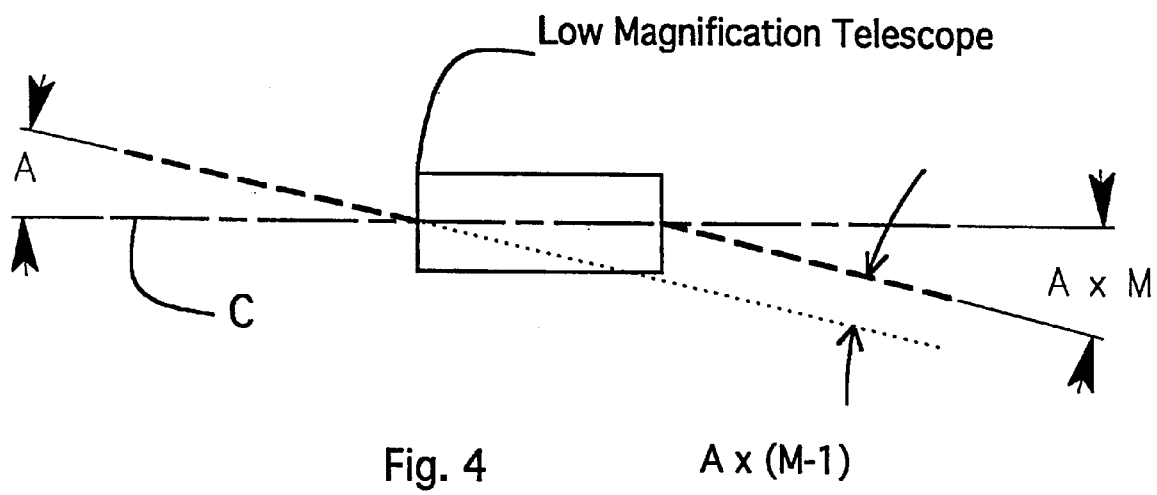
FIG. 4 shows the path of a beam entering and leaving a low magnification telescope, indicating the angular beam deviation.
Figure 5:
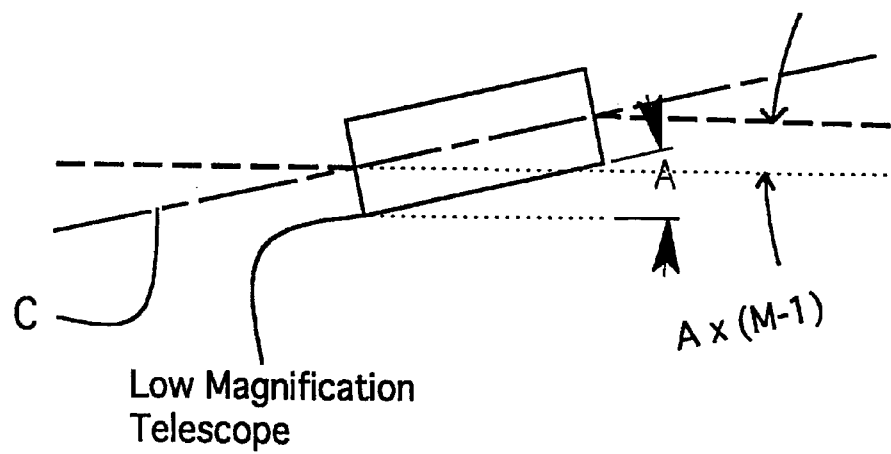
FIG. 5 shows how tilting the telescope causes the beam to deviate by an amount according to the magnification of the telescope.
Figure 6:
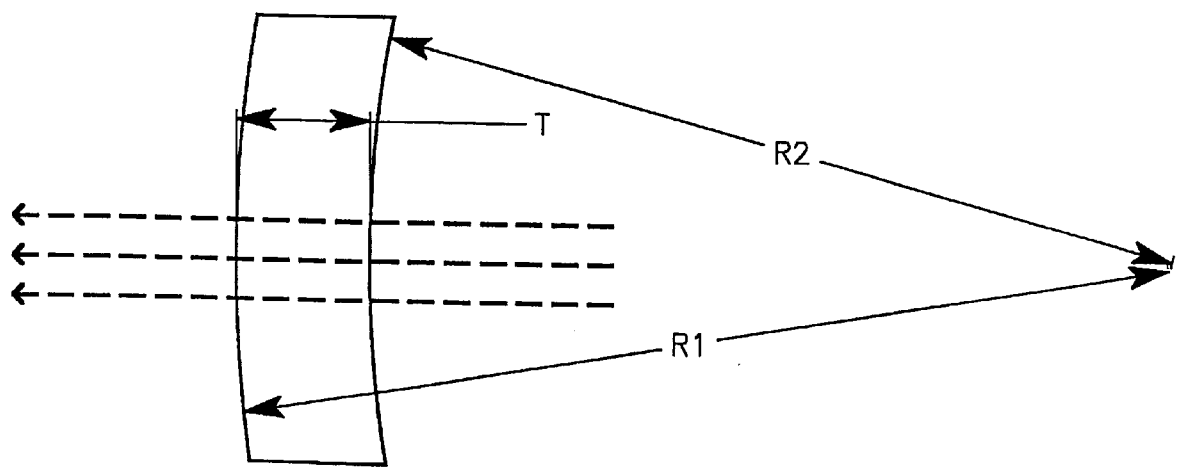
FIG. 6 is a detail drawing of a low magnification optic comprising a part of the invention.
Figures 7A, 7B:
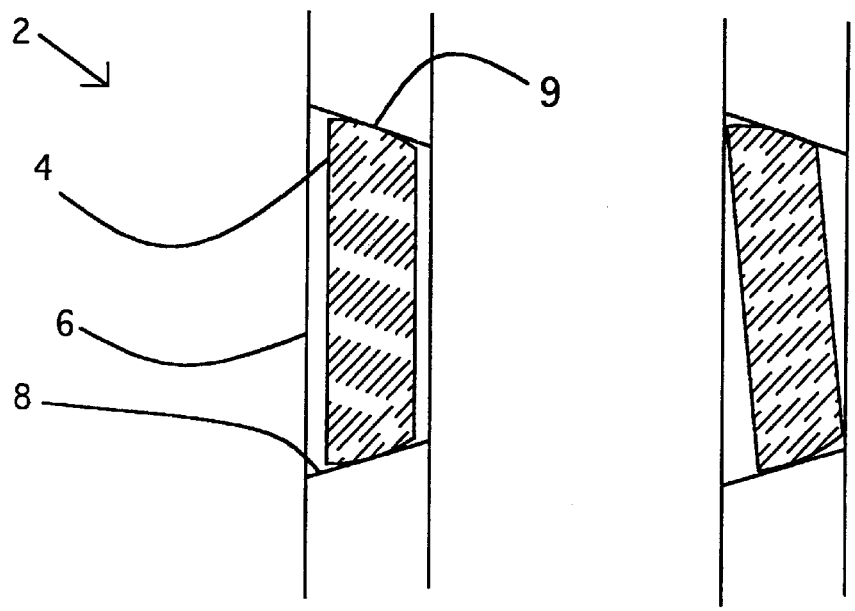
FIGS. 7A and 7B are side section views of a preferred embodiment showing the optic pivoting in a conical socket of an instrument housing or frame.

A typical application of the subject invention is shown at 2 in FIG. 7A. The housing or frame 6 of an optical instrument has a conical hole 8 through the housing wall. An optic 4, preferably a plastic element, makes contact with the conical surface, allowing the optic to pivot, thus angularly adjusting the beam. The optical element 4 preferably has an approximately spherical outer edge or annulus 9. An adhesive such as RTV (not specifically shown) manufactured by General Electric can be used to seal the joint between the plastic optic 4 and the conical socket 8. A thin layer of this viscous cement makes possible the accurate adjustment of the angle by simply pushing on the edges of the optic. This system will also work with a spherical socket matching that on the optic edges. In either case a hermetic seal is achieved.

An alternate preferred embodiment 12 is shown in FIGS. 8, 8A and 8B, using adjustment screws to finely adjust the beam deviation of the transmitted beam. The frame or housing 14 has a conical or spherical hole 13 into which the optic 18 is held by a holder member 15. Orthogonally located screws 16 on the member 15 adjust the angle of the optic to the housing on two axes, thus providing the steering required. A spring member 20 holds the optic in the conical or spherical hole providing the seal and bearing for the tilting. A screw 22 holds the spring member 20 to a standoff 24, keeping pressure on the optic in its seat in the housing. FIG. 8A and FIG. 8B are section views showing how the screws 16 tilt the optic holder member 15 to steer the beam.

The above described preferred embodiments are intended to illustrate the principles of the invention, but not to limit its scope. Other embodiments and variations to this preferred embodiment will be apparent to those skilled in the art and may be made without departing from the spirit and scope of the invention as defined in the following claims.

I claim:

1. In a device which projects a substantially collimated light beam that must be precisely angularly related to an optical reference, the device including a housing or frame, an apparatus for finely adjusting the angle of the light beam, comprising:

a low magnification telescope formed of a single, integral optical component, the telescope being positioned in the path of the collimated light beam, the optical component having edges in contact with the frame of the device, and means for tilting the telescope relative to the frame, whereby the titling of the telescope adjusts the angularity of the collimated light beam as it emerges from the telescope.

2. The apparatus of claim 1, wherein the telescope is circular and wherein the edges of the telescope define an annulus which is substantially a portion of a sphere.

3. The apparatus of claim 2, wherein the frame of the device forms a socket or seat within which the annulus of the telescope edge resides, the seat also being substantially spherical with substantially the same center as the annulus of the telescope, whereby the telescope may be tilted within the seat while still maintaining a seal with the frame.

4. The apparatus of claim 2, wherein the frame of the device forms a seat within which the annulus of the telescope edge resides, the seat being substantially conical in shape, whereby the telescope may be tilted within the seat while still maintaining a seal with the frame.

5. The apparatus of claim 2, including a cement between the annulus of the telescope and the seat in the frame, holding the telescope fixed in place in the frame.

6. The apparatus of claim 5, wherein the cement retains the telescope in the seat so as to form a hermetic seal between the telescope and the frame.

7. The apparatus of claim 2, including spring means for holding the telescope closely against the seat of the frame even during tilting adjustment of the telescope, and further including screw threaded means for adjusting the tilt of the telescope relative to the frame.

8. The apparatus of claim 1, wherein the single, integral optical component of the telescope comprises a molded plastic optic element.

9. The apparatus of claim 1, wherein the low magnification telescope has a magnification of about 1.05 or less.

10. The apparatus of claim 8, wherein the magnification of the telescope is about 1.01.

11. In a device which projects a collimated light beam which must be precisely angularly related to an optical reference, the device including a housing or frame, an apparatus for finely adjusting the angle of the light beam, comprising:

a low magnification telescope formed of a single, integral optical component, the telescope being positioned in the path of the collimated light beam, the optical component having inner and outer surfaces, and comprising a net optical wedge between the two surfaces, and means for tilting the telescope relative to the frame, whereby the titling of the telescope adjusts the angularity of the collimated light beam as it emerges from the telescope, and whereby the net optical wedge increases the angular beam adjustment effect in one direction, thus allowing the telescope to be rotated to orient the increased effect in a direction as needed.

12. The method of claim 11, wherein the low magnification telescope has a magnification of about 1.05 or less.

13. The method of claim 11, wherein the step of fixing the telescope in position comprises applying cement between the telescope and the seat in the frame or housing to hold the telescope fixed in place and to establish a seal between the telescope and the frame or housing.

14. A method for finely adjusting the angle of a collimated light beam projected by an instrument wherein the light beam must be precisely angularly related to an optical reference, comprising:

positioning a low magnification telescope formed of a single optical component in the path of the collimated light beam, tilting the low magnification telescope relative to a frame or housing of the instrument, and thereby adjusting the angularity of the projected collimated light beam relative to the instrument, and fixing the low magnification telescope in position once the projected light beam is at the desired angularity.

15. The method of claim 14, wherein the low magnification telescope is circular, with edges defining an annulus which is substantially a portion of a sphere.

16. The method of claim 15, wherein the frame of the instrument forms a socket or seat within which the annulus of the telescope is positioned, the seat being substantially spherical with substantially the same spherical center as the annulus of the telescope, and including placing the annulus of the telescope in contact with the seat to maintain a seal with the frame or housing.

17. The method of claim 16, further including placing a cement between the annulus of the telescope and the seat in the frame to form a hermetic seal.

18. The method of claim 14, wherein the frame of the instrument forms a socket or seat within which the annulus of the telescope is positioned, the seat being substantially conical, and including placing the annulus of the telescope in contact with the seat to maintain a seal with the frame or housing.

19. The method of claim 18, further including placing a cement between the annulus of the telescope and the seat in the frame to form a hermetic seal.

* * * * *